(12) United States Patent
Liu

(10) Patent No.: US 11,416,068 B2
(45) Date of Patent: Aug. 16, 2022

(54) METHOD AND APPARATUS FOR HUMAN-COMPUTER INTERACTION IN DISPLAY DEVICE, AND COMPUTER DEVICE AND STORAGE MEDIUM

(71) Applicant: Guohua Liu, Guangdong (CN)

(72) Inventor: Guohua Liu, Guangdong (CN)

( * ) Notice: Subject to any disclaimer, the term of this patent is extended or adjusted under 35 U.S.C. 154(b) by 0 days.

(21) Appl. No.: 17/059,091

(22) PCT Filed: May 22, 2019

(86) PCT No.: PCT/CN2019/087901
§ 371 (c)(1),
(2) Date: Nov. 25, 2020

(87) PCT Pub. No.: WO2019/228236
PCT Pub. Date: Dec. 5, 2019

(65) Prior Publication Data
US 2021/0223857 A1    Jul. 22, 2021

(30) Foreign Application Priority Data
May 31, 2018   (CN) .......................... 201810550530.1

(51) Int. Cl.
*G06F 3/01* (2006.01)
*G06F 9/451* (2018.01)
(Continued)

(52) U.S. Cl.
CPC .............. *G06F 3/012* (2013.01); *G06F 3/013* (2013.01); *G06F 3/14* (2013.01); *G06F 9/451* (2018.02);
(Continued)

(58) Field of Classification Search
CPC ...................................................... G06F 3/012
See application file for complete search history.

(56) References Cited

U.S. PATENT DOCUMENTS

| 6,152,563 | A   | 11/2000 | Hutchinson et al. |
| 2013/0231938 | A1* | 9/2013 | Vertegaal ................ G06F 3/013 704/275 |
| 2014/0111420 | A1* | 4/2014 | Ahn ...................... G02B 27/017 345/156 |

FOREIGN PATENT DOCUMENTS

| CN | 101866215 | 10/2010 |
| CN | 102957743 | 3/2013 |

(Continued)

OTHER PUBLICATIONS

International Search Report issued for International Patent Application No. PCT/CN2019/087901, dated Aug. 23, 2019, 5 pages including English translation.

*Primary Examiner* — Gustavo Polo
(74) *Attorney, Agent, or Firm* — Hamre, Schumann, Mueller & Larson, P.C.

(57) ABSTRACT

The present application provides a method and apparatus for human-computer interaction in a display device, and a computer device and a storage medium. The method comprises: a display device acquiring current image data of a user, and displaying multiple pieces of different candidate data in different display regions when it is detected that the user is in a squarely viewing state, so that the user browses the candidate data; and the display device identifying a target display region which is focused on, and reading candidate data corresponding to the target display region, and executing an operation corresponding to the read candidate data.

19 Claims, 7 Drawing Sheets

(51) Int. Cl.
  *G06F 3/14* (2006.01)
  *G06F 21/32* (2013.01)
  *G06V 40/18* (2022.01)
  *G06V 40/16* (2022.01)
(52) U.S. Cl.
  CPC ............ *G06F 21/32* (2013.01); *G06V 40/166* (2022.01); *G06V 40/172* (2022.01); *G06V 40/174* (2022.01); *G06V 40/18* (2022.01); *G06V 40/178* (2022.01)

(56) References Cited

FOREIGN PATENT DOCUMENTS

| | | |
|---|---|---|
| CN | 103826145 | 5/2014 |
| CN | 107239139 | 10/2017 |
| CN | 108897589 | 11/2018 |

\* cited by examiner

METHOD AND APPARATUS FOR HUMAN-COMPUTER INTERACTION IN DISPLAY DEVICE, AND COMPUTER DEVICE AND STORAGE MEDIUM

CROSS REFERENCES TO RELATED APPLICATION

This patent application claims priority to Chinese patent application No. 2018105505301, filed on May 31, 2018, entitled "METHOD AND APPARATUS FOR HUMAN-COMPUTER INTERACTION IN DISPLAY DEVICE, AND COMPUTER DEVICE AND STORAGE MEDIUM" the disclosure of which is hereby incorporated by reference in its entirety.

TECHNICAL FIELD

The present disclosure relates to a method, a device, a computer device, and a storage medium for a human-computer interaction in a display device.

BACKGROUND

Human-computer interaction refers to a process of information exchange between human and a device, in which a defined task is completed by using a certain dialogue language between human and the device in a certain interactive manner.

With the development of science and technology, application fields of human-computer interaction technology, for example, as small as a play button of a radio, as large as a dashboard on an airplane or a control room of a power plant, are becoming wider and wider. Users can communicate with a system and perform operations by using a human-computer interaction interface. At present, in the human-computer interaction technology, a human-computer interaction mode is single, which requires the user to issue a specific voice command, and then in responding to this, a display device perform further operations.

SUMMARY

Accordingly, as for above problems, it is necessary to provide a method, a device, a computer device and a storage medium for a human-computer interaction in a display device.

A method for a human-computer interaction in a display device includes:
 obtaining current image data of a user;
 when detecting that the user is in a front-view state, displaying multiple different candidate data in different display areas;
 recognizing a target display area where the user is gazing;
 reading the candidate data corresponding to the target display area, and performing an operation corresponding to the read candidate data.

In one of the embodiments, the method further includes, after reading the candidate data corresponding to the target display area, and performing the operation corresponding to the read candidate data:
 when detecting that the user is not in the front-view state, interrupting the operation corresponding to the read candidate data.

In one of the embodiments, the when detecting that the user is in the front-view state, displaying the multiple different candidate data in the different display areas includes:
 when detecting that the user is in the front-view state, counting time for which the user is in the front-view state;
 when the time for which the user is in the front-view state exceeds a preset time threshold, displaying the multiple different candidate data in the different display areas.

A device for a human-computer interaction in a display device includes:
 an image data acquisition module configured to acquire current image data of a user;
 a display module configured to display multiple different candidate data in different display areas when detecting that the user is in a front-view state;
 a recognition module configured to identify a target display area where the user is gazing; and
 an execution module configured to read candidate data corresponding to the target display area and perform an operation corresponding to the read candidate data.

A computer device includes a processor storing a computer program and a memory. When executing the computer program, the processor implements the steps of the method as described above.

A computer-readable storage medium stores a computer program thereon. When being executed by a processor, the computer program implements the steps of the method as described above.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

The following drawings of the present disclosure are used herein as part of the present disclosure to understand the present disclosure. Embodiments of the present disclosure and description thereof are illustrated in the accompanying drawings to explain the principle of the present disclosure.

DETAILED DESCRIPTION OF THE EMBODIMENTS

Although the conventional human-computer interaction mode can realize the human-computer interaction function to a certain extent, due to the single interaction mode, certain specific pose actions need to be pre-defined. The interaction process is not very natural, and to a certain extent, which brings inconvenience to the user when performing operations.

In order to illustrate objects, technical solutions and advantages of the present application clearer, the present application will be further described in detail below with reference to the accompanying drawings and embodiments. It should be understood that the specific embodiments described here are only used to explain the present application, and not to limit the present application.

Figure 1:
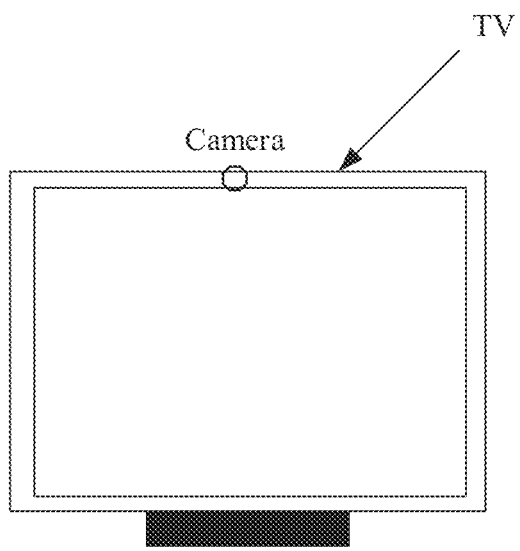
FIG. 1 is an application environment diagram of a method for a human-computer interaction in a display device according to an embodiment.
Figure 1:
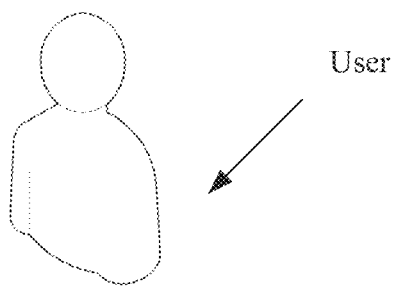

Methods for a human-computer interaction in a display device provided in this application can be applied to an application environment as shown in FIG. 1. A user appears within a visual angle range of a display device. The display device (television) obtains current image data of the user. When detecting that the user is in a front-view state, multiple different candidate data are displayed in different display areas. The user browses the candidate data in the display device. The display device recognizes a target display area where the user is gazing. The display device reads the candidate data corresponding to the target display area, and performs an operation corresponding to the read candidate data. The display device may specifically be a television, a tablet computer, a tiled display device, a vehicle-mounted display device, or the like.

Figure 2:
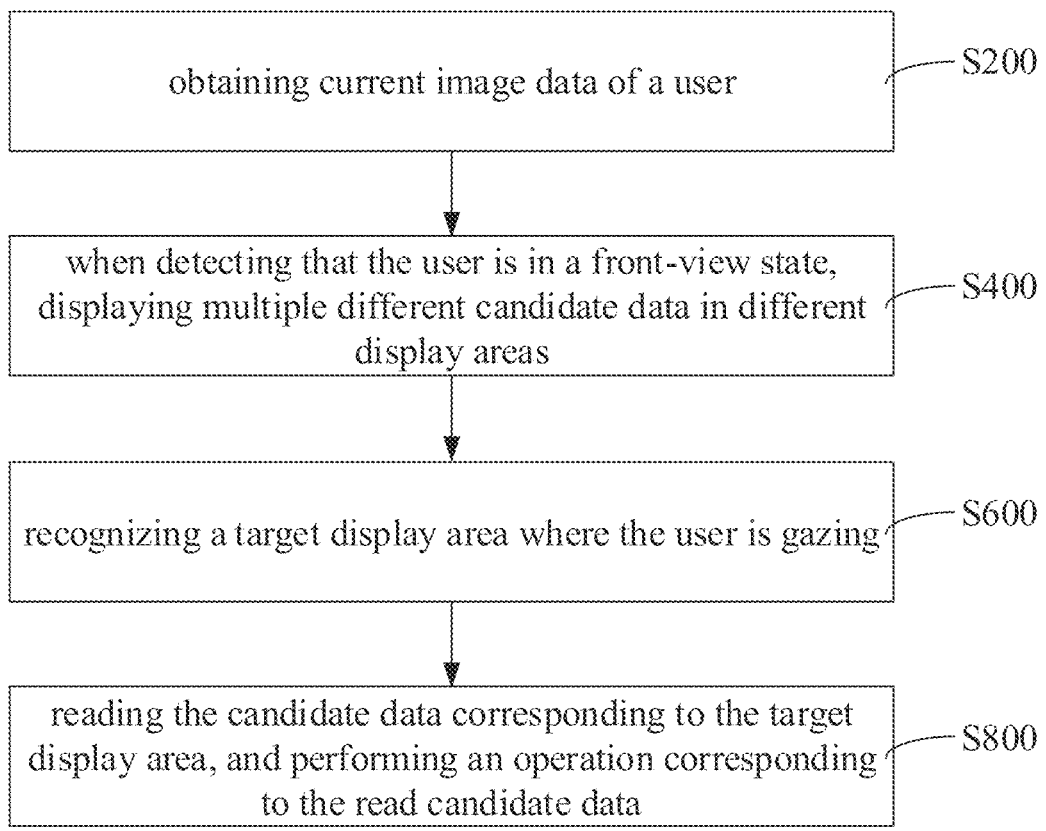
FIG. 2 is a schematic flowchart of the method for the human-computer interaction in the display device according to an embodiment.

In an embodiment, as shown in FIG. 2, a method for the human-computer interaction in a display device is provided. Taking the method applied to a display device as an example for description, the method includes the following steps:

S200: obtaining current image data of a user.

The display device may obtain the current image data of the user by means of a camera built-in or external to the display device. Specifically, the camera can be provided on the display device. The camera can be rotated by 360 degrees to capture images of the user and obtain the current image data of the user. Furthermore, the camera can be provided directly in front of the display device. The camera acquires the current image data of the user who enters the visual angle range of the display device.

S400: when detecting that the user is in a front-view state, displaying multiple different candidate data in different display areas.

A front-view recognition is performed on the current image data of the user obtained in step S200. When detecting that the user is in the front-view state, the multiple different candidate data are displayed in the different display areas. For simplicity, "front-view recognition" here can be understood as a "switching" action. When detecting that the user is in the front-view state, the display device immediately displays the multiple different candidate data in the different display areas. Furthermore, the detection can be performed by comparing the current image data of the user with historically obtained image data of the user in the front-view state. In practical applications, front-view image data of the display device in the front-view state acquired by an image acquisition device is first obtained. The front-view image data of the display device in the front-view state can be the data acquired in a historical record or the data acquired on the spot. The image acquisition device can be a camera or the like. Here, the front-view image data of the display device in the front-view state is acquired by the image acquisition device. The image acquisition device can be provided on the display device, or on an auxiliary device or a peripheral device of the display device. For example, when the device is a television (TV), the image acquisition device can be provided on the TV or on a set-top box that is matched with the TV. More specifically, after performing image processing and image target coordinate conversion on the front-view image data of the display device in the front-view state captured by the camera, a relative position of the device and the user's face can be determined. That is, face image data of the user in the front-view state of the display device can be obtained. The determination that the display device is in the front-view state can be achieved by using techniques such as head pose estimation or gaze tracking.

S600: recognizing a target display area where the user is gazing.

Figure 3:
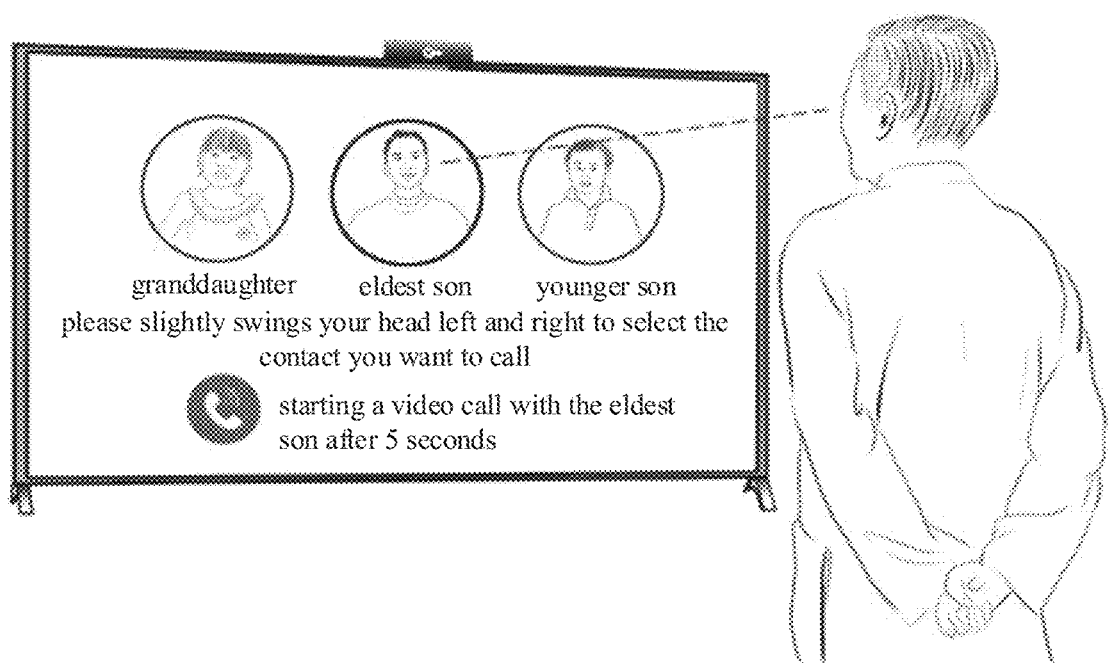
FIG. 3 is an application environment diagram of a method for a human-computer interaction in a display device according to another embodiment.

Adopting techniques such as head post estimation and gaze tracking can accurately identify the target display area where the user is gazing. Specifically, different data is displayed in the different display areas on the display device. The user directly gazes (watches) the target display area according to his own needs when browsing the theses data. In practical applications, the position where the user is gazing can be recognized based on the gaze tracking technology. Staying time of the user's gaze in each display area is cumulatively counted. The candidate display area corresponding to the staying time that firstly and cumulatively exceeds a preset gazing time threshold is selected as the target display area where the user is gazing. For example, as shown in FIG. 3, currently, three display areas on left, middle, and right of the TV show contents of "call the granddaughter, the eldest son, and the younger son". The user has been gazing the middle display area for the longest time. That is, the target display area where the user is gazing is recognized as the middle display area.

S800: reading the candidate data corresponding to the target display area, and performing an operation corresponding to the read candidate data.

The relationship between each display area and the corresponding data is stored in the display device. After the target display area is determined in step S600, the display device directly reads the stored candidate data corresponding to the target display area, runs the candidate data, and performs corresponding operations. Based on taking the embodiment shown in FIG. 3 as an example, after determining that the middle display area is the target display area in step S600, the display device reads the data of "call to an eldest son" and performs the operation of "call to eldest son". Optionally, when the display device does not have a communication function, a peripheral device (a communication device) can be controlled to perform the operation corresponding to the read candidate data.

In the above-mentioned method for the human-computer interaction in the display device, the display device obtains the current image data of the user. When detecting that the user is in the front-view state, the multiple different candidate data are displayed in different display areas. The user browses the candidate data. The display device recognizes the target display area that is being gazed, reads the candidate data corresponding to the target display area, and performs the operation corresponding to the read candidate data. In the whole process, user's needs can be perceived without excessive operation, which realizes a convenient human-computer interaction, and brings convenient operation to users.

Figure 4:
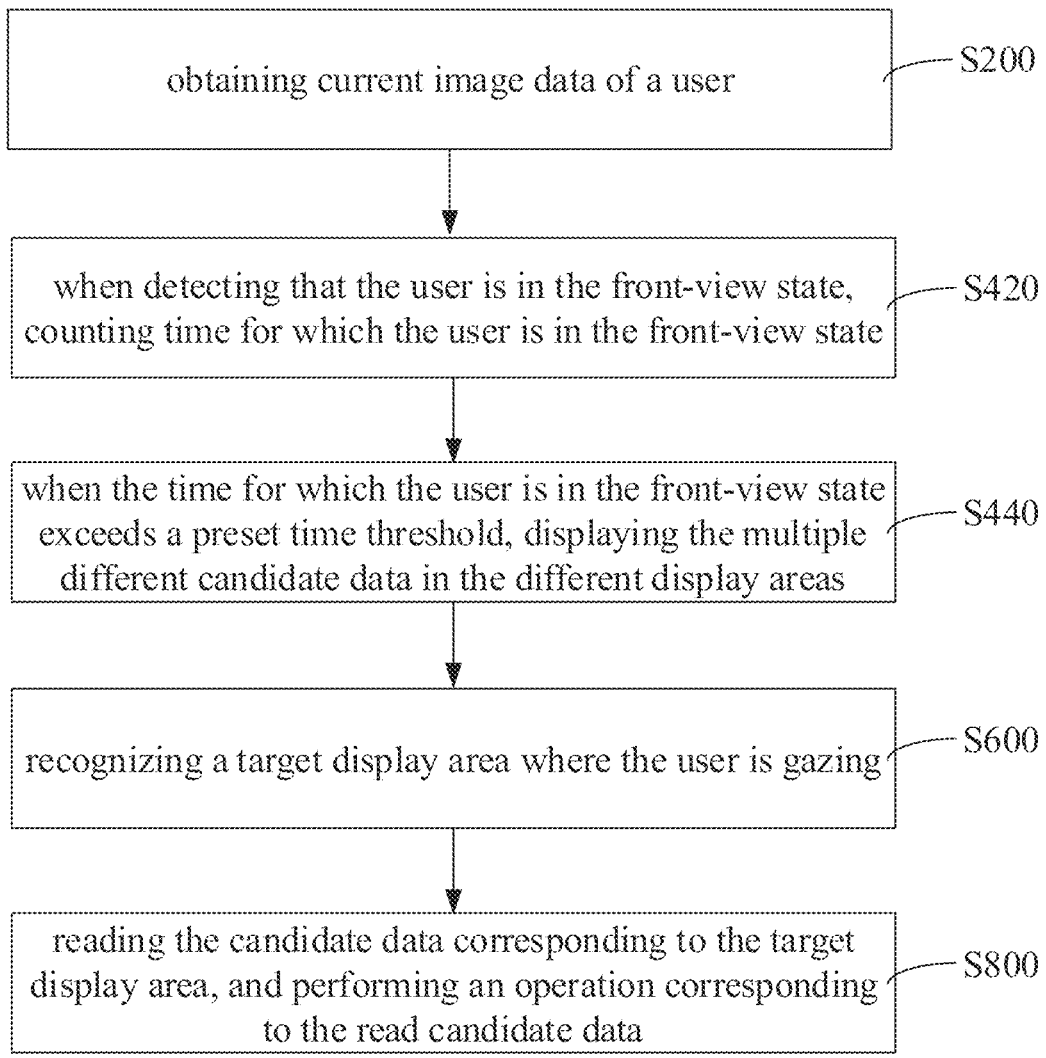
FIG. 4 is a schematic flowchart of the method for the human-computer interaction in the display device according to another embodiment.

As shown in FIG. 4, in one of the embodiments, after step S800, the method further includes:

S900: when detecting that the user is not in the front-view state, interrupting the operation corresponding to the read candidate data.

When the display device detects that the user is not in the front-view state, the operation corresponding to the read candidate data is interrupted. Continuing to take the embodiment shown in FIG. 3 as an example, during that the TV is performing the operation of calling to the eldest son, when detecting that the user is not in the front-view state, the operation is interrupted. Optionally, step S900 may be performed within a limited time range. That is, when detecting that the user is not in the front-view state within a limited time range (for example, 10 seconds), the operation corresponding to the read candidate data is interrupted, so the user does not have to maintain the front-view state for a long time, which brings convenience to users. When the user wants to end the current operation, the user can be in a "non-front-view state" with the display device. When detecting that the user is not in the front-view state, the TV will interrupt the current operation. For example, the user currently wants to end the call with the eldest son, and the user will turn his head away, such that the TV recognizes that the user is not in the front-view state, and interrupts the call with the elder son.

As shown in FIG. 4, in one of the embodiments, S400 includes:

S420: when detecting that the user is in the front-view state, counting time for which the user is in the front-view state;

S440: when the time for which the user is in the front-view state exceeds a preset time threshold, displaying the multiple different candidate data in the different display areas.

Here, as for the front-view state, the requirement for the preset time threshold is further introduced. Only when the user is in the front-view state for more than the preset time threshold, the multiple different candidate data will be displayed in the different display areas. The user gazes at the TV (in the front-view state) for a certain time (3 seconds), and the TV displays the different candidate data in the different display areas. By adopting the above-mentioned method, misoperation of the user during daily use can be avoided, bringing convenience to the user.

In one of the embodiments, when detecting that the user is in the front-view state, the displaying the multiple different candidate data in the different display areas includes: according to the current image data of the user, adopting a front-view recognition technology to preliminarily detect whether the user is in the front-view state; when the preliminary detection result is that the user is in the front-view state, acquiring the face image of the user; according to the face image of the user, performing recognition processing; according to the recognition processing result, displaying the multiple different candidate data in the different display areas. The recognition processing includes at least one of a face recognition, an age recognition, an facial expression recognition, and a gender recognition.

In this embodiment, the front-view recognition, combined with the face recognition, or the age recognition, or the facial expression recognition, or the gender recognition is adopted to more accurately display the interaction data of the user. Specifically, firstly according to the current image data of the user, the front-view recognition technology is adopted to preliminarily determine whether the user is in the front-view state. When the user is in the front-view state, the face image of the user is acquired. At least one processing of the face recognition, the age recognition, the facial expression recognition, and the gender recognition is performed on the acquired frontal face image. According to the processing result, the multiple different candidate data are displayed in the different display areas. For example, when based on the front-view recognition combined with the face recognition, the user's identity is recognized, and the candidate data associated with the user's identity, such as the user's address book, and avatars of the user's relatives, can be displayed in different display areas. When based on the front-view recognition, combined with the face recognition and the facial expression recognition, the user's identity is recognized, and it is preliminarily recognized that the user has a happy facial expression at present, the candidate data associated with the identity and in which the user is interested, such as user's favorite TV programs, user's favorite pictures, photos, and the like, can be displayed in the different display areas.

In one of the embodiments, the above-mentioned method for the human-computer interaction in the display device further includes: when a size of the face image of the user is greater than a preset face image size threshold, displaying the multiple different candidate data in the different display areas.

As a distance between the user and the display device is different, the size of the face image of the user in the user's images acquired by the display device is different. In addition, the human-computer interaction is effective only when the user is within a certain distance from the display device. For example, during that the user performs the human-computer interaction with the TV, if the user is tens of meters away from the TV, the human-computer interaction between the user and the TV is obviously an invalid human-computer interaction action. In this embodiment, based on the above-mentioned principles and actual application requirements, only when the size of the user's face image is greater than the preset face image size threshold, the multiple different candidate data can be displayed in the different display areas. The preset face image size threshold can be a face image acquired when presetting the distance between the user and the display device, for example, an acquired face image pre-acquired when the user is 3 meters away from the TV device, the size of corresponding frontal face image is obtained as the preset the face image size threshold.

In one of the embodiments, the when the preliminary detection result is that the user is in the front-view state, acquiring the face image of the user includes: when the preliminary detection result is that the user is in the front-view state, performing the face recognition on the user; and when recognizing the user as a known legitimate user, acquiring the face image of the user.

When detecting that the user is in the front-view state, the face recognition is performed on the user to determine whether the user is a known legitimate user. When the user is a known legitimate user, the frontal face image of the user is acquired. In this embodiment, a dual mechanism combining the front-view recognition and the user identity recognition is adopted to identify whether multiple different candidate data needs to be displayed in different display areas, so as to avoid misoperation and bring convenience to the user.

In one of the embodiments, the above-mentioned method for the human-computer interaction in the display device further includes:

When recognizing the user's identity by the face recognition, displaying multiple different candidate data associated with the user's identity in the different display areas.

The candidate data is associated with the user's identity. For example, when recognizing the user's identity, multiple contact information associated with the user can be displayed in the different display areas. For example, the contact information of the daughter, the son, and the mother can be displayed in the three display areas on the left, middle, and right.

In one of the embodiments, the recognizing the target display area where the user is gazing includes: adopting a head pose recognition technology to confirm an orientation and an angle of the user's head; according to the orientation and the angle of the user's head, recognizing a display area being browsed by the user, and using the display area being browsed by the user as the candidate display area; respectively counting the staying time of the user gaze in the different candidate display areas; selecting the candidate display area with the longest staying time as the target display area where the user is gazing.

It should be understood that, although the various steps in the flowcharts of FIGS. 2 and 4 are displayed in sequence as indicated by arrows, these steps are not necessarily performed sequentially in the order indicated by the arrows. Unless clearly illustrated herein, performing these steps is not strictly restricted in order, and these steps can be performed in other orders. Moreover, at least part of the steps in FIGS. 2 and 4 may include multiple sub-steps or multiple stages. These sub-steps or stages are not necessarily performed at the same time, but can be performed at different times. These sub-steps or stages are not necessarily performed in sequence, but can be performed in turn with or alternately with at least part of other steps, or sub-steps or stages of the other steps.

Figure 5:
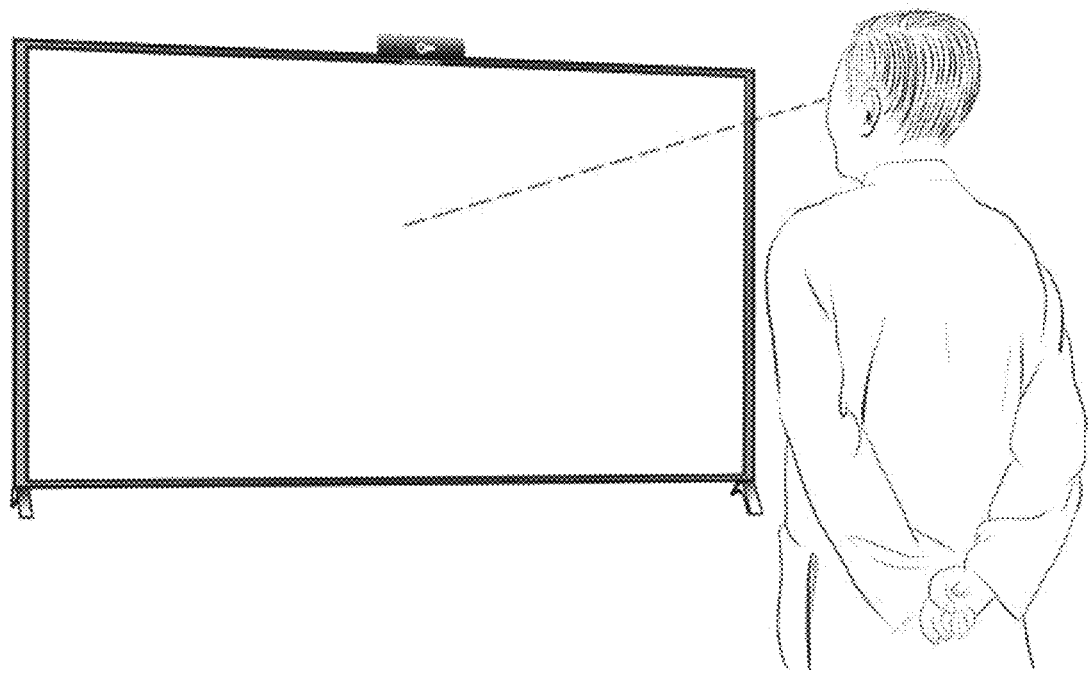
FIG. 5 is an application environment diagram of the method for the human-computer interaction in the display device according to another embodiment.

In order to further explain the technical solutions and effects of the method for the human-computer interaction in the display device of the present application in detail, the detailed description will be made below by taking the application to the TV as a specific application example, in conjunction with FIGS. 3, 5, 6, 7 and 8. When applied to the TV, the method for the human-computer interaction in the display device of this application includes the following steps:

1. As shown in FIG. 5, when the user faces the TV screen, the TV acquires the image data of the user.

2. The TV determines whether the user is in the front-view state according to the acquired image data of the user, the details are as shown in FIG. 5 and FIG. 3. The user is frontally facing the center of the TV. The TV detects that the user is in the front-view state, and multiple different candidate data are displayed in different display areas on the TV. Specifically, three contacts of the granddaughter, the eldest son, and the younger son are displayed on the left, middle and right of the TV, and voiceover or explanatory data is displayed in other blank areas (this part of the content may not be implemented).

Figure 6:
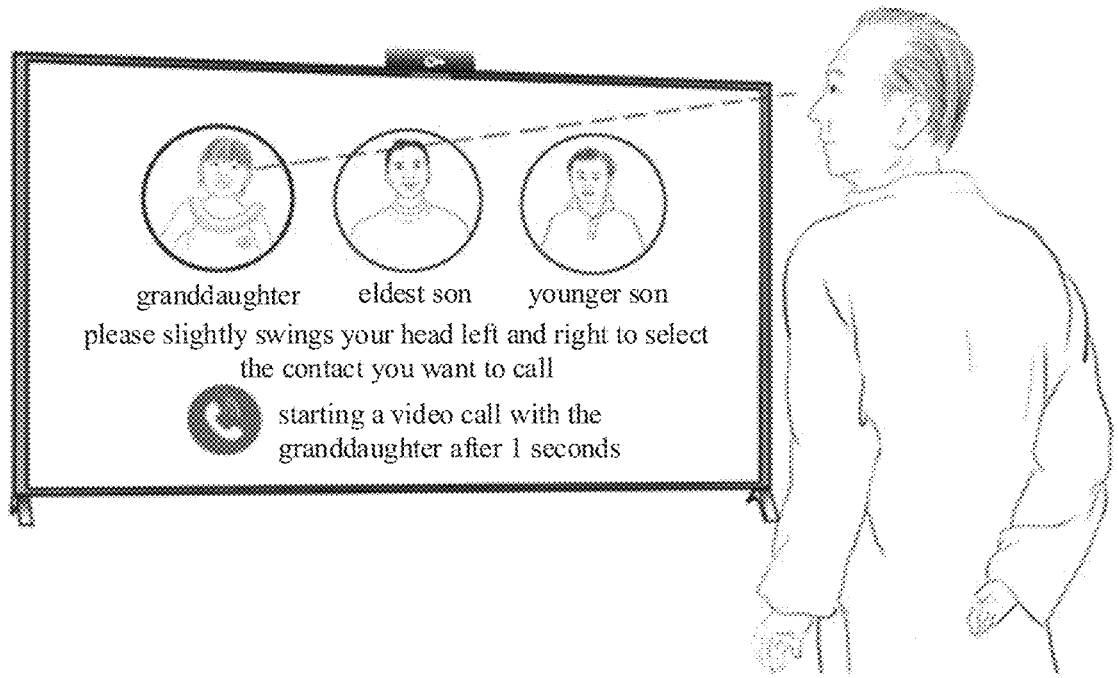
FIG. 6 is an application environment diagram of the method for the human-computer interaction in the display device according to another embodiment.

3. As shown in FIG. 6, the user slightly swings his/her head left and right to select one of the contacts by gazing at it. A video call can be made after staying there for 3 seconds. The TV adopts a dual recognition mechanism combining the front-view recognition and the user's identity recognition to identify that the current user is a legitimate user, and that the target display area where the user is gazing is the left area.

Figure 7:
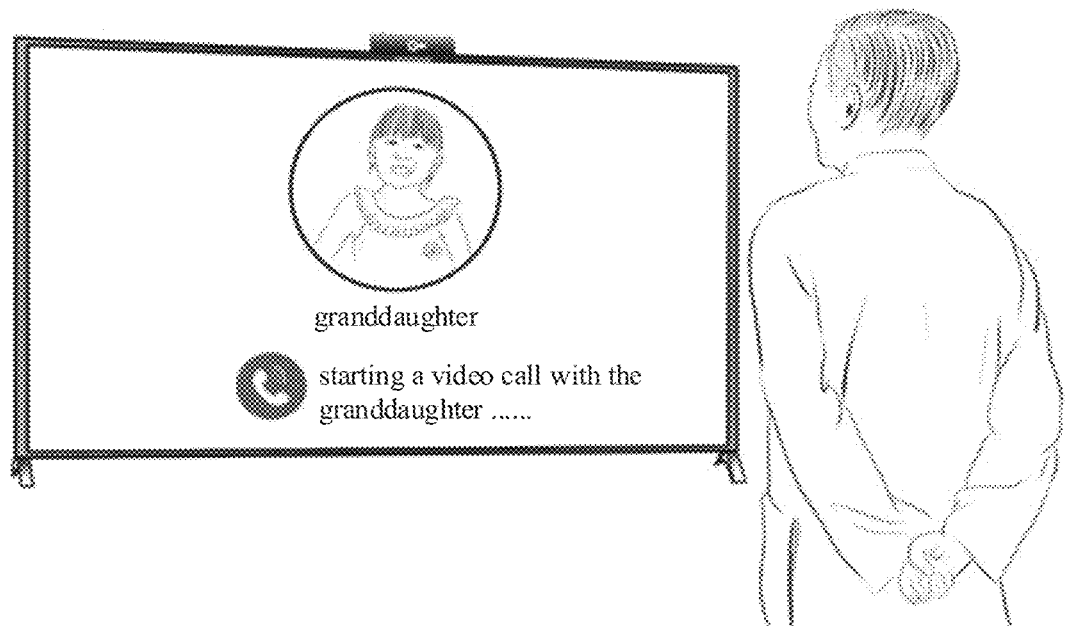
FIG. 7 is an application environment diagram of the method for the human-computer interaction in the display device according to another embodiment.

4. The TV reads the candidate data corresponding to the left area and performs the corresponding operation. As shown in FIG. 7, the TV reads the data related to the granddaughter's video call and starts a video call with the granddaughter.

Figure 8:
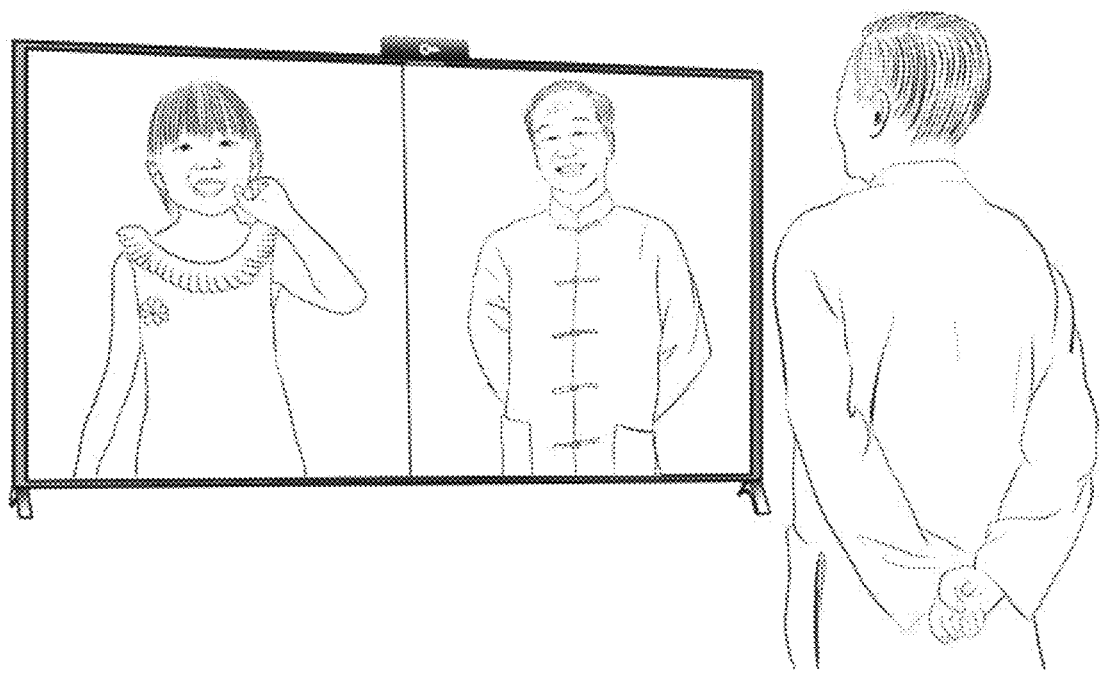
FIG. 8 is an application environment diagram of the method for the human-computer interaction in the display device according to another embodiment.

5. As shown in FIG. 8, when the video call is connected, the image of the video call is displayed on the TV. When the user needs to interrupt or end the video call, the user can turn his/her head and gazing at the TV sideways. The TV detects that the current user is in the non-front-view state and then ends the video call.

Figure 9:
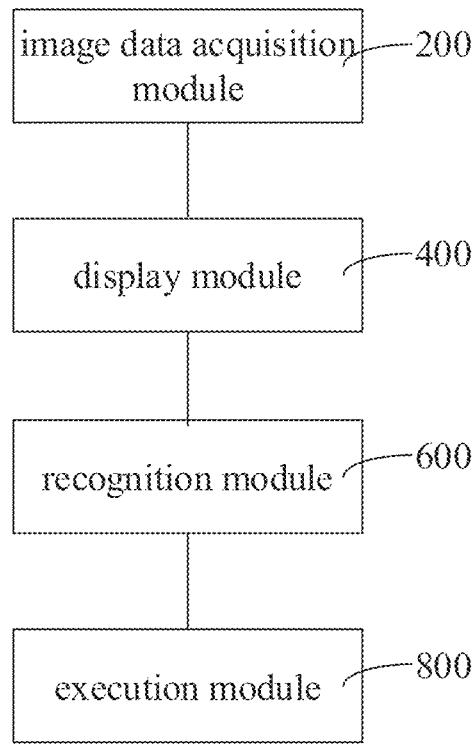
FIG. 9 is a structural block diagram of a device for a human-computer interaction in a display device according to an embodiment.

As shown in FIG. 9, a device for a human-computer interaction in a display device includes:

an image data acquisition module 200 configured to acquire current image data of a user;

a display module 400 configured to display multiple different candidate data in different display areas when detecting that the user is in a front-view state;

an recognition module 600 configured to identify a target display area where the user is gazing;

an execution module 800 configured to read candidate data corresponding to the target display area and perform an operation corresponding to the read candidate data.

In the above-mentioned device for the human-computer interaction in the display device, the image data acquisition module 200 acquires the current image data of the user. When detecting that the user is in the front-view state, the display module 400 displays the multiple different candidate data in the different display areas. The user browses the candidate data. The recognition module 600 recognizes the target display area that is being gazed. The execution module 800 reads the candidate data corresponding to the target display area, and performs the operation corresponding to the read candidate data. In the whole process, user's needs can be perceived without excessive operation, which realizes a convenient human-computer interaction, and brings convenient operation to users.

In one of the embodiments, the above-mentioned device for the human-computer interaction in the display device further includes:

an interrupt module configured to interrupt the operation corresponding to the read candidate data when detecting that the user is not in the front-view state.

In one of the embodiments, the display module 400 is further configured to, when detecting that the user is in the front-view state, count time for which the user is in the front-view state; and when the time for which the user is in the front-view state exceeds a preset time threshold, display multiple different candidate data in the different display areas.

In one of the embodiments, the display module 400 is also configured to, according to the current image data of the user, adopt the front-view recognition technology, preliminarily detect whether the user is in the front-view state; when the preliminary detection result is that the user is in the front-view state, acquire a face image of the user; perform a recognition processing and; according to the recognition processing result, display the multiple different candidate data in the different display areas. The recognition processing includes at least one of a face recognition, an age recognition, an facial expression recognition, and a gender recognition.

In one of the embodiments, the display module 400 is further configured to: when the preliminary detection result is that the user is in the front-view state, perform the face recognition on the user; when recognizing that the user is a known legitimate user, acquire the face image of the user.

In one of the embodiments, the display module 400 is further configured to, when recognizing the user's identity by the face recognition, display the multiple different candidate data associated with the user's identity in the different display areas.

In one of the embodiments, the recognition module 600 adopts a head pose recognition technology to confirm an orientation and an angle of the user's head; recognizes a display area being browsed by the user according to the orientation and the angle of the user's head; and uses the display area being browsed by the user as the candidate display area; cumulatively counts a staying time of the user's gaze in different candidate display areas, respectively; selects the candidate display area corresponding to the staying time that firstly and cumulatively exceeds a preset gazing time threshold as the target display area where the user is gazing.

For the specific definition of the device for the human-computer interaction in the display device, reference can be made to the above definition of the method for the human-computer interaction in the display device, which will not be repeated here. Each module in the above-mentioned device for the human-computer interaction in the display device can be implemented in whole or in part by software, hardware, and a combination thereof. The above-mentioned modules may be embedded in a processor in the computer device in a form of hardware or independent of the processor in the computer device, or may be stored in a memory of the computer device in a form of software, such that the processor can call and perform the operations corresponding to each module as described above.

Figure 10:
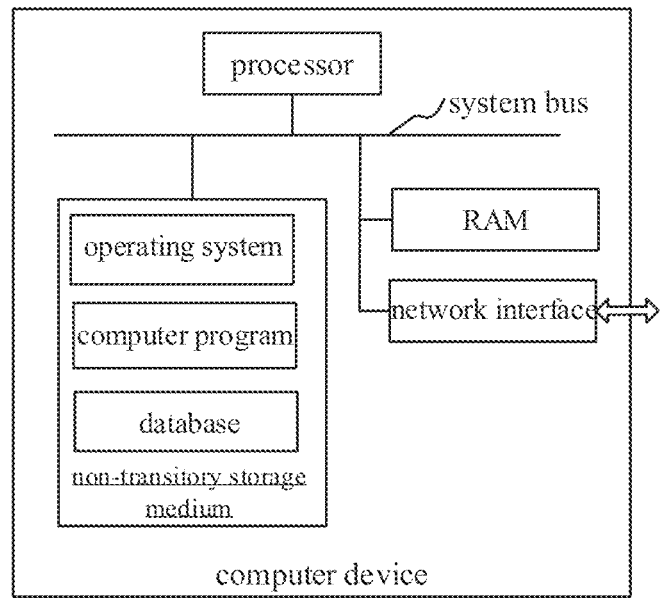
FIG. 10 is a view of an inner structure of a computer device according to an embodiment.

In an embodiment, a computer device is provided. The computer device may be a server. An internal structure diagram of the computer device may be as shown in FIG. 10. The computer device includes a processor, a memory, a network interface and a database connected through a system bus. The processor of the computer device is configured to provide calculation and control capabilities. The memory of the computer device includes a non-transitory storage medium and an internal memory. The non-transitory storage medium stores an operating system, a computer program, and a database. The internal memory provides an environment for the operation of the operating system and computer programs in the non-transitory storage medium. The database of the computer device is configured to store the image data of the user in the front-view state. The network interface of the computer device is configured to communicate with an external terminal through a network connection. The computer program is executed by the processor to implement a method for the human-computer interaction in a display device.

Those skilled in the art can understand that the structure shown in FIG. 10 is only a block diagram of part of the structure related to the solution of the present application, and does not constitute a limitation on the computer device to which the solution of the present application is applied. The specific computer device may include more or less components than shown in the figure, or combine with some components, or have a different arrangement of the components.

In an embodiment, a computer device is provided, which includes a memory, a processor, and a computer program stored in the memory and capable of being run in the processor. When executing the computer program, the processor implements the following steps:

Current image data of a user is obtained;

When detecting that the user is in a front-view state, multiple different candidate data are displayed in different display areas;

A target display area where the user is gazing is recognized;

The candidate data corresponding to the target display area is read, and an operation corresponding to the read candidate data is performed.

In an embodiment, when executing the computer program, the processor further implements the following step:

When detecting that the user is not in the front-view state, the operation corresponding to the read candidate data is interrupted.

In an embodiment, when executing the computer program, the processor further implements the following steps:

When detecting that the user is in the front-view state, the time for which the user is in the front-view state is counted. When the time for which the user is in the front-view state exceeds a preset time threshold, the multiple different candidate data are displayed in the different display areas.

In an embodiment, when executing the computer program, the processor further implements the following steps:

According to the current image data of the user, the front-view recognition technology is adopted to preliminarily detect whether the user is in the front-view state. When the preliminary detection result is that the user is in the front-view state, the face image of the user is acquired. According to the face image of the user, the recognition processing is performed. According to the recognition processing result, the multiple different candidate data are displayed in the different display areas. The recognition processing includes at least one of a face recognition, an age recognition, an facial expression recognition, and a gender recognition.

In an embodiment, when executing the computer program, the processor further implements the following step:

When recognizing the user's identity by the face recognition, multiple different candidate data associated with the user's identity are displayed in the different display areas.

In an embodiment, when executing the computer program, the processor further implements the following steps:

When the preliminary detection result is that the user is in the front-view state, the face recognition is performed on the user. When recognizing that the user as a known legitimate user, the face image of the user is acquired.

In an embodiment, when executing the computer program, the processor further implements the following steps:

A head pose recognition technology is adopted to confirm an orientation and an angle of the user's head. According to the orientation and the angle of the user's head, the display area being browsed by the user is recognized. The display area being browsed by the user is used as the candidate display area. The staying time of the user gaze in the different candidate display areas is cumulatively counted, respectively. The candidate display area corresponding to the staying time that firstly and cumulatively exceeds a preset gazing time threshold is selected as the target display area where the user is gazing.

In an embodiment, a computer-readable storage medium is provided, on which a computer program is stored. When being executed by a processor, the computer program implements the following steps:

Current image data of a user is acquired.

When detecting that the user is in a front-view state, multiple different candidate data are displayed in different display areas:

A target display area where the user is gazing is recognized;

Candidate data corresponding to the target display area is read, and an operation corresponding to the read candidate data is performed.

In an embodiment, when being executed by the processor, the computer program further implements the following step:

When detecting that the user is not in the front-view state, the operation corresponding to the read candidate data is interrupted.

In an embodiment, when being executed by the processor, the computer program further implements the following steps:

When detecting that the user is in the front-view state, the time for which the user is in the front-view state is counted. When the time for which the user is in the front-view state exceeds a preset time threshold, the multiple different candidate data are displayed in the different display areas.

In an embodiment, when being executed by the processor, the computer program further implements the following steps.

According to the current image data of the user, the front-view recognition technology is adopted to preliminarily detect whether the user is in the front-view state. When the preliminary detection result is that the user is in the front-view state, the face image of the user is acquired. According to the face image of the user, a recognition processing is performed. According to the recognition processing result, the multiple different candidate data are displayed in the different display areas. The recognition processing includes at least one of a face recognition, an age recognition, an facial expression recognition, and a gender recognition.

In an embodiment, when being executed by the processor, the computer program further implements the following step:

When recognizing the user's identity by the face recognition, the multiple different candidate data associated with the user's identity are displayed in the different display areas.

In an embodiment, when being executed by the processor, the computer program further implements the following steps:

When the preliminary detection result is that the user is in the front-view state, the face recognition is performed on the user. When recognizing the user as a known legitimate user, the face image of the user is acquired.

In an embodiment, when executing the computer program, the processor further implements the following steps:

A head pose recognition technology is adopted to confirm an orientation and an angle of the user's head. According to the orientation and the angle of the user's head, the display area being browsed by the user is recognized. The display area being browsed by the user is used as the candidate display area. The staying time of the user gaze in the different candidate display areas is cumulatively counted, respectively. The candidate display area corresponding to the staying time that firstly and cumulatively exceeds a preset gazing time threshold is selected as the target display area where the user is gazing.

A person of ordinary skill in the art can understand that all or part of the processes in methods according to the aforementioned embodiments can be implemented by instructing relevant hardware via a computer program, which can be stored in a non-transitory computer-readable storage medium. When the computer program is executed, the processes of the various methods according to the aforementioned embodiments may be included. Where, any reference to memory, storage, database or other medium used in the embodiments according to this application may include a non-transitory memory and/or a transitory memory. The non-transitory memory may include a read-only memory (ROM), a programmable ROM (PROM), an electrically programmable ROM (EPROM), an electrically erasable programmable ROM (EEPROM), or flash memory. The transitory memory may include a random-access memory (RAM) or an external cache memory. As an illustration but not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM), Rambus direct RAM (RDRAM), direct memory bus dynamic RAM (DRDRAM), memory bus dynamic RAM (RDRAM), and the like.

The technical features of the aforementioned embodiments can be combined arbitrarily. In order to simply the description, all possible combinations of the technical features in the aforementioned embodiments are not described. However, as long as there is no contradiction in the combinations of these technical features, they should be considered to be fallen into the range described in the present specification.

Only several implementations of the present application are illustrated in the aforementioned embodiments, and the description thereof is relatively specific and detailed, but it should not be understood as a limitation on the scope of the present application. It should be noted that for those of ordinary skill in the art, without departing from the concept of the present application, several modifications and improvements can be made, which all fall within the protection scope of the present application. Therefore, the protection scope of the present application shall be subject to the appended claims.

What is claimed is:

1. A method for a human-computer interaction in a display device, comprising:
    obtaining current image data of a user;
    when detecting that the user is in a front-view state, displaying multiple different candidate data in different display areas;
    recognizing a target display area where the user is gazing; and
    reading the candidate data corresponding to the target display area, and performing an operation corresponding to the read candidate data,
    wherein the recognizing the target display area where the user is gazing comprises:
    adopting a head pose recognition technology to confirm an orientation and an angle of the user's head;
    according to the orientation and the angle of the user's head, recognizing a display area being browsed by the user, and using the display area being browsed by the user as the candidate display area;
    respectively counting the staying time of the user's gaze in the different candidate display areas; and
    selecting the candidate display area corresponding to the staying time that firstly and cumulatively exceeds a preset gazing time threshold as the target display area where the user is gazing.

2. The method according to claim 1, further comprising, after reading the candidate data corresponding to the target display area, and performing the operation corresponding to the read candidate data:
    when detecting that the user is not in the front-view state, interrupting the operation corresponding to the read candidate data.

3. The method according to claim 1, wherein the when detecting that the user is in the front-view state, displaying the multiple different candidate data in the different display areas comprises:
- when detecting that the user is in the front-view state, counting time for which the user is in the front-view state; and
- when the time for which the user is in the front-view state exceeds a preset time threshold, displaying the multiple different candidate data in the different display areas.

4. The method according to claim 1, wherein the when detecting that the user is in the front-view state, displaying the multiple different candidate data in the different display areas comprises:
- according to the current image data of the user, adopting a front-view recognition technology to preliminarily detect whether the user is in the front-view state;
- when the preliminary detection result is that the user is in the front-view state, acquiring a face image of the user; and
- according to the face image of the user, performing a recognition processing; according to the recognition processing result, displaying the multiple different candidate data in the different display areas,
- wherein the recognition processing comprises at least one of a face recognition, an age recognition, a facial expression recognition, and a gender recognition.

5. The method according to claim 4, wherein the when the preliminary detection result is that the user is in the front-view state, acquiring the face image of the user comprises:
- when the preliminary detection result is that the user is in the front-view state, performing the face recognition on the user; and
- when recognizing the user as a known legitimate user, acquiring the face image of the user.

6. The method according to claim 5, further comprising:
- when recognizing the user's identity by the face recognition, displaying multiple different candidate data associated with the user's identity in the different display areas.

7. The method according to claim 5, further comprising, after acquiring the face image of the user:
- when a size of the face image of the user is greater than a preset face image size threshold, displaying the multiple different candidate data in the different display areas.

8. A computer device, comprising a processor storing a computer program and a memory, when executing the computer program, the processor implements the steps of:
- obtaining current image data of a user;
- when detecting that the user is in a front-view state, displaying multiple different candidate data in different display areas;
- recognizing a target display area where the user is gazing; and
- reading the candidate data corresponding to the target display area, and performing an operation corresponding to the read candidate data,
- wherein the recognizing the target display area where the user is gazing comprises:
- adopting a head pose recognition technology to confirm an orientation and an angle of the user's head;
- according to the orientation and the angle of the user's head, recognizing a display area being browsed by the user, and using the display area being browsed by the user as the candidate display area;
- respectively counting the staying time of the user's gaze in the different candidate display areas; and
- selecting the candidate display area corresponding to the staying time that firstly and cumulatively exceeds a preset gazing time threshold as the target display area where the user is gazing.

9. A non-transitory computer-readable storage medium, on which a computer program is stored, when being executed by a processor, the computer program implements the steps of:
- obtaining current image data of a user;
- when detecting that the user is in a front-view state, displaying multiple different candidate data in different display areas;
- recognizing a target display area where the user is gazing; and
- reading the candidate data corresponding to the target display area, and performing an operation corresponding to the read candidate data,
- wherein the recognizing the target display area where the user is gazing comprises:
- adopting a head pose recognition technology to confirm an orientation and an angle of the user's head;
- according to the orientation and the angle of the user's head, recognizing a display area being browsed by the user, and using the display area being browsed by the user as the candidate display area;
- respectively counting the staying time of the user's gaze in the different candidate display areas; and
- selecting the candidate display area corresponding to the staying time that firstly and cumulatively exceeds a preset gazing time threshold as the target display area where the user is gazing.

10. The computer device according to claim 8, the processor further executes the computer program to implement, after reading the candidate data corresponding to the target display area, and performing the operation corresponding to the read candidate data:
- when detecting that the user is not in the front-view state, interrupting the operation corresponding to the read candidate data.

11. The computer device according to claim 8, wherein the when detecting that the user is in the front-view state, displaying the multiple different candidate data in the different display areas comprises:
- when detecting that the user is in the front-view state, counting time for which the user is in the front-view state; and
- when the time for which the user is in the front-view state exceeds a preset time threshold, displaying the multiple different candidate data in the different display areas.

12. The computer device according to claim 8, wherein the when detecting that the user is in the front-view state, displaying the multiple different candidate data in the different display areas comprises:
- according to the current image data of the user, adopting a front-view recognition technology to preliminarily detect whether the user is in the front-view state;
- when the preliminary detection result is that the user is in the front-view state, acquiring a face image of the user; and
- according to the face image of the user, performing a recognition processing; according to the recognition processing result, displaying the multiple different candidate data in the different display areas, wherein the recognition processing comprises at least one of a face recognition, an age recognition, a facial expression recognition, and a gender recognition.

13. The computer device according to claim 12, wherein the when the preliminary detection result is that the user is in the front-view state, acquiring the face image of the user comprises:
when the preliminary detection result is that the user is in the front-view state, performing the face recognition on the user; and
when recognizing the user as a known legitimate user, acquiring the face image of the user.

14. The computer device according to claim 13, the processor further executes the computer program to implement:
when recognizing the user's identity by the face recognition, displaying multiple different candidate data associated with the user's identity in the different display areas.

15. The non-transitory storage medium according to claim 9, the processor further executes the computer program to implement, after reading the candidate data corresponding to the target display area, and performing the operation corresponding to the read candidate data:
when detecting that the user is not in the front-view state, interrupting the operation corresponding to the read candidate data.

16. The non-transitory storage medium according to claim 9, wherein the when detecting that the user is in the front-view state, displaying the multiple different candidate data in the different display areas comprises:
when detecting that the user is in the front-view state, counting time for which the user is in the front-view state; and
when the time for which the user is in the front-view state exceeds a preset time threshold, displaying the multiple different candidate data in the different display areas.

17. The non-transitory storage medium according to claim 9, wherein the when detecting that the user is in the front-view state, displaying the multiple different candidate data in the different display areas comprises:
according to the current image data of the user, adopting a front-view recognition technology to preliminarily detect whether the user is in the front-view state;
when the preliminary detection result is that the user is in the front-view state, acquiring a face image of the user; and
according to the face image of the user, performing a recognition processing; according to the recognition processing result, displaying the multiple different candidate data in the different display areas,
wherein the recognition processing comprises at least one of a face recognition, an age recognition, a facial expression recognition, and a gender recognition.

18. The non-transitory storage medium according to claim 17, wherein the when the preliminary detection result is that the user is in the front-view state, acquiring the face image of the user comprises:
when the preliminary detection result is that the user is in the front-view state, performing the face recognition on the user; and
when recognizing the user as a known legitimate user, acquiring the face image of the user.

19. The non-transitory storage medium according to claim 18, the processor further executes the computer program to implement:
when recognizing the user's identity by the face recognition, displaying multiple different candidate data associated with the user's identity in the different display areas.

* * * * *